(12) United States Patent
Isakson

(10) Patent No.: US 6,928,917 B1
(45) Date of Patent: Aug. 16, 2005

(54) CONTROL VALVE

(75) Inventor: Larry E Isakson, Mishawaka, IN (US)

(73) Assignee: Robert Bosch Corp, Broadview, IL (US)

( * ) Notice: Subject to any disclaimer, the term of this patent is extended or adjusted under 35 U.S.C. 154(b) by 51 days.

(21) Appl. No.: 10/707,527

(22) Filed: Dec. 19, 2003

(51) Int. Cl.⁷ .................................................. F15B 9/10
(52) U.S. Cl. ........................................ 91/49; 91/376 R
(58) Field of Search ........................... 60/547.3; 91/49, 91/376 R

(56) References Cited

U.S. PATENT DOCUMENTS

| | | | |
|---|---|---|---|
| 3,967,536 A * | 7/1976 | Bach | 91/371 |
| 4,961,846 A * | 10/1990 | Isakson | 210/131 |
| 5,339,722 A * | 8/1994 | Mauro et al. | 91/376 R |
| 6,170,381 B1 * | 1/2001 | Cramer et al. | 91/376 R |

* cited by examiner

Primary Examiner—Thomas E. Lazo
(74) Attorney, Agent, or Firm—Leo H McCormick, Jr.; Warren Comstock

(57) ABSTRACT

A valve arrangement for controlling the flow of pressurized fluid between a working chamber and an outlet chamber that passes between a seal and a seat surrounding an orifice to the outlet chamber. Fluid flowing through the orifice produces a first turbulence produces a broad band sound that is within an acceptable audible level. An actuation force applied to an input rod after overcoming a force of a return spring moves the seal toward the seat to restrict the flow of fluid from the working chamber through the orifice. The restriction in the flow of fluid through the orifice produces a second turbulence in the fluid that is communicated to the outlet chamber. The seal has an annular ring that extends into the orifice to divert the flow of fluid having the second turbulence away from the return spring to attenuate the development of a reaction in the return spring that would significantly add to the broad band sound.

6 Claims, 2 Drawing Sheets

CONTROL VALVE

BACKGROUND OF INVENTION

This invention relates to a control valve for a brake booster having a control valve that restricts the flow of fluid from an inlet port past a seat to an outlet port during a brake application and a shroud on the control valve that deflects the flow of fluid from impinging on a return spring to attenuate the development of a reaction in the return spring that may create an undesirable audible noise.

The structural components in hydraulic _Hlt429300206_Hlt429300206 brake boosters, such as illustrated in U.S. Pat. No. 4,961,846, are designed to permit fluid under pressure in a fluid supply system to continually flow from an inlet port through a power piston to an outlet port when in an inactive or rest position. In actuation position, an input force applied to a control valve moves the control valve toward a valve seat in the power piston to restrict the flow of fluid present in an inlet chamber and create a fluid pressure differential across the power piston. After overcoming a return spring, the pressure differential acts on and moves the power piston to develop an output force. When the control valve is in the rest position, fluid freely flows through the power piston and creates an essentially broad band non-reaction sound. This broad band non-reaction sound is combined with noises produced by the engine and other components in a vehicle and is accepted as a total overall operational sound of the vehicle. When the flow of fluid through the power piston is restricted, a corresponding resonant frequency is created by the flow of fluid to the outlet port that is manifested as an undesirable noise or audible resonant sound. U.S. Pat. No. 6,170,381 discloses the use of a labyrinth seal that is located on a face of the control valve to modify or change the frequency created by fluid flowing past the seat to the outlet port. However, in further evaluation of brake boosters it was discovered that other factors and structural relationships including the effect of flowing fluid acting on the return spring caused a reaction that produced a whistle as the fluid flows to the outlet port during a brake application.

SUMMARY OF INVENTION

It is an object of this invention to provide a brake booster with a control valve that directs the flow of fluid away from a return spring and attenuate the development of a reaction frequency in the return spring that may produce an objectionable sound.

According to the present invention, the fluid power apparatus has a housing with a bore therein that is divided by a power piston into an inlet chamber and an outlet chamber. The power piston has a passageway and an orifice therein through which the inlet chamber is connected with the outlet chamber. A valve is located in the passageway for controlling the flow of a fluid under pressure from a source through the orifice. The valve includes a valve seal, a valve spring and an input rod. The valve spring urges the valve seal into engagement with the input rod to define a working chamber within the passageway that is connected to the chamber. Fluid under pressure flows from the working chamber to the outlet chamber after passing between the valve seal and a valve seat surrounding the orifice. When the control valve is in the rest position, fluid freely flows past the orifice however a first turbulence is created therein to produce a first reaction frequency that is manifested as an acceptable audible sound. When the input rod is moved by an operator to effect a brake application, the valve seal is moved toward the valve seat to restrict the flow of fluid from the working chamber through the orifice. The restriction in the flow of fluid across the valve seat causes a corresponding increase in the fluid pressure present in the working and inlet chambers. The increase in fluid pressure acts on the power piston to create an output force. The restriction of the flow of fluid from the working chamber corresponds to an increase in the velocity of the fluid at the restriction that is communicated to the outlet chamber resulting in a change in turbulence of the fluid to create a second reaction frequency. The valve is characterized by an annular ring that extends from the seal and into the orifice to prevent the second turbulence from impinging on the valve spring and creating a resonant noise therein that exceeds an acceptable audible range.

An advantage of a brake booster using this invention resides in its operation without the development of reaction noise in a return spring.

A further advantage of the brake booster of this invention is provided through the use of a shroud to divert fluid from impinging on a return spring and creating a resonant frequency therein that would produce noise.

DETAILED DESCRIPTION

Figure 1:
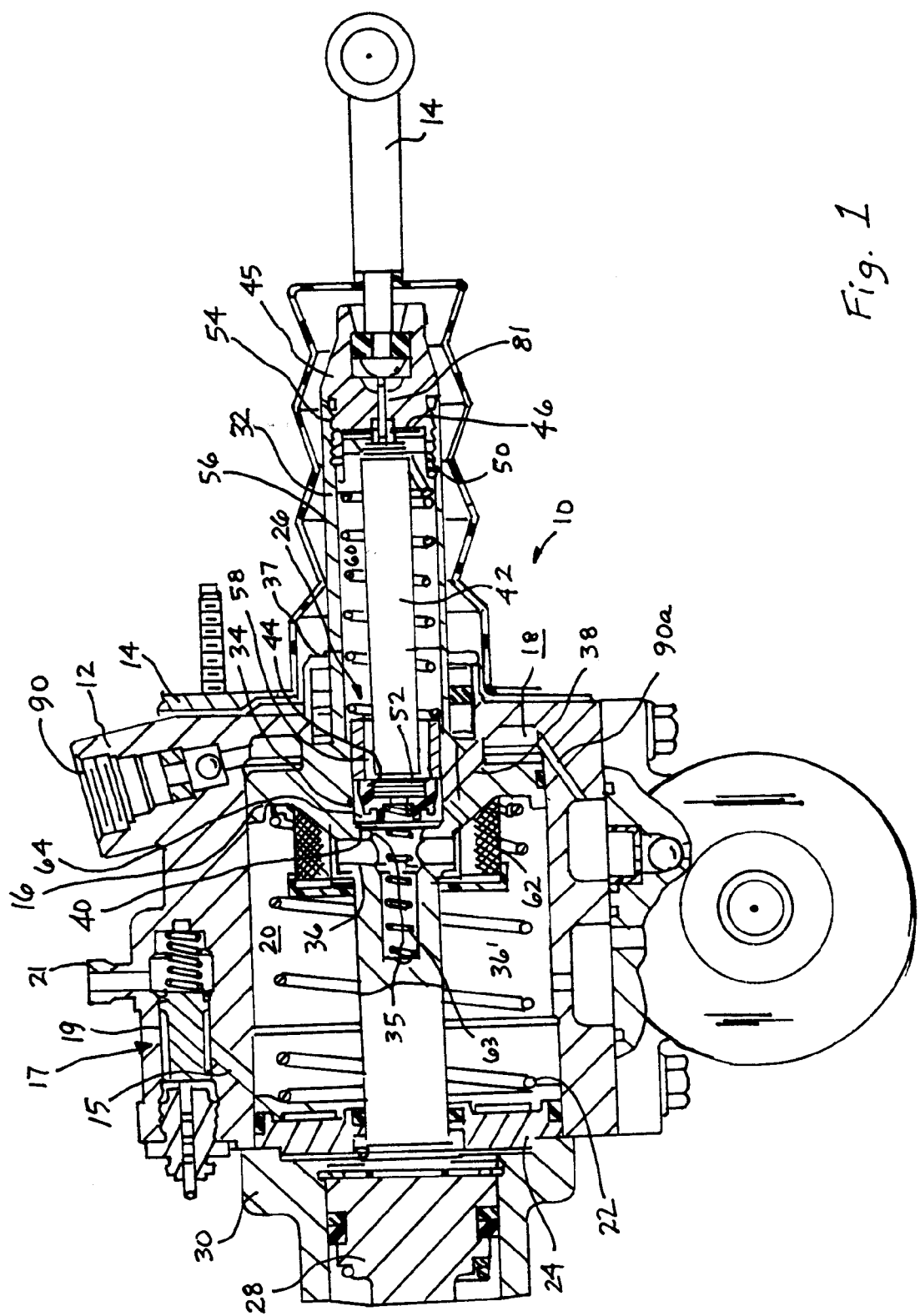
FIG. 1 is a schematic illustration of a brake booster that includes a brake seal made according to the present invention.
Figure 2:
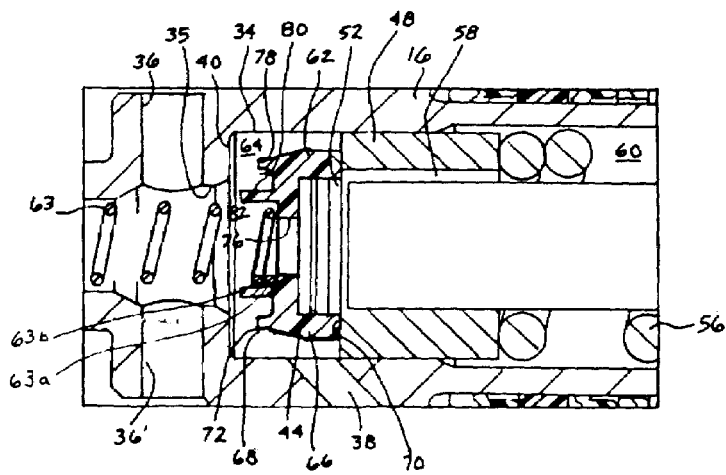
FIG. 2 is an enlarged sectional view of the circumscribed area of the control valve of FIG. 1.

The brake booster 10 as shown in FIGS. 1 and 2 for use in a brake system is of a type disclosed in U.S. Pat. No. 4,961,846 and as modified by the present invention. The brake booster 10 includes a housing 12 that is secured to a dash panel of a vehicle and connected by an input rod 14 to a brake pedal for effecting a brake application in response to an input force applied by an operator. The housing 12 has an internal cavity that is divided by a power piston 16 into an inlet chamber 18 and an outlet chamber 20 with a return spring 22 located in the internal cavity. The return spring 22 has a first end that engages a closure end wall 24 of housing 12 and a second end that biases the power piston 16 toward the inlet chamber 18. The power piston 16 has passageway through which the inlet chamber 18 is connected with the outlet chamber 20. A control valve 26 that is located in the passageway responds to an input force applied by the brake pedal to input rod 14 to restrict the flow of fluid under pressure from the inlet chamber 18 through the passageway to the outlet chamber 20. The restriction in the flow of fluid to the outlet chamber 20 results in a corresponding increase in the fluid pressure of the fluid in the inlet chamber 18. This increase in fluid pressure creates a pressure differential across the power piston 16 that acts on and after overcoming the force of return spring 22 moves the power piston 16 toward the outlet chamber 20 to provide a piston 28 in a master cylinder 30 with a force to pressurize fluid and supply a brake system with pressurized fluid to effect a desired brake application.

In more particular detail, the power piston 16 has a cylindrical projection 32 that extends through opening 37 in housing 12. The passageway of the power piston 16 includes an axial bore 34 in the cylindrical projection 32, a plurality of radial cross bores or outlet passages 36,36" and inlet passages 38 (only one is shown). The inlet passages 38 connects inlet chamber 18 to axial bore 34 while the plurality of radial cross bores or outlet passages 36,36" connect axial bore 34 with the outlet chamber 20. The radial cross bores 36,36" are located in power piston 16 down steam from a valve seat 40 for an orifice 35 located in axial bore 34.

The control valve 26 that is located in axial bore 34 includes an input rod 42, a valve seal 62, a first cylindrical bearing 48, a reaction spring 56, a second cylindrical bearing 50 and a valve spring 63. The control valve 26 is retained in bore 34 by fixing an end cap 45 to cylindrical projection 32. A reaction pin 81 that is linked to push rod 14 communicates an operational input from a brake pedal to control valve 26.

The input rod 42 is defined by a cylindrical shaft that has a first end 44 and a second end 46 with the first cylindrical bearing 48 surrounding the input rod 42 near the first end 44 while a second cylindrical bearing 50 surrounds the input rod 42 near the second end 46. The first cylindrical bearing 48 engages a shoulder formed by head 52 on input rod 42 while the second cylindrical bearing 50 is retained on input rod 42 by a snap ring 54 to cage a reaction spring 56. The first bearing 48 has a series of slots 58 (only one is shown) that allows fluid presented to the orifice 35 to be communicated to a reaction chamber 60 formed in bore 34 between the first bearing 48 and second bearing 50. The valve seal 62 is located in axial bore 34 and is urged by valve spring 63 into engagement with the first cylindrical bearing 48. The valve seal 62, first cylindrical bearing 48, valve seat 40 and power piston 16 define a working chamber 64 within bore 34 that is more clearly shown in FIG. 2.

The valve seal 62 has a generally cylindrical body 66 with a first end 68 and a second end 70. The first end 68 has face 72 thereon and with valve seat 40 defines a flow path from working chamber 64 to outlet chamber 20 by way of orifice 35 in axial bore 34 and the cross bores 36,36". Cylindrical body 66 has an essentially closed center 74 with a central opening 76 with the closed center 74 forming a base for spring 63 while the second end 70 is urged against the first cylindrical bearing 48 to separate the working chamber 64 from the reaction chamber 60. The central opening 76 provides a communication path between that portion of bore 34 adjacent orifice 35 and the reaction chamber 60. The face 72 of the first end of the cylindrical body 66 has a first ring 78 and a concentric second ring or annular projection 80 that extends from the face 72 into the orifice 35. The annular projection 80 defines a shroud that protects the end coils 63a,63b of the spring 63 from being directly in a flow path from the working chamber 64 to orifice 35.

Figure 3:
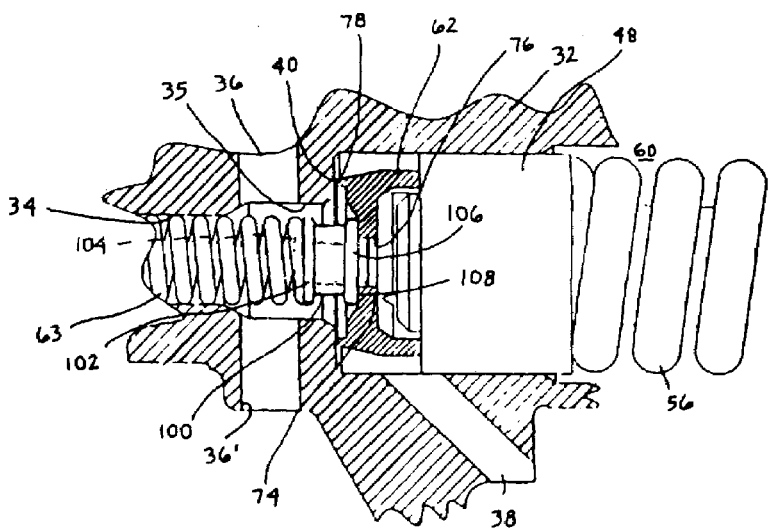
FIG. 3 is an enlarged sectional view of a second embodiment of the seal for the control valve.

Further, the second annular projection 80 may also be defined as a sleeve 100 as shown in FIG. 3 that has a shoulder 102 on a first end 104 for receiving end coils 63a of spring 63 and a second shoulder 106 on a second end 108 that is located in central opening 76. The sleeve 100 positions the coils 63a and 63b of spring 63 within the orifice 35 out of a direct flow path of fluid from working chamber 64 and thereby preventing the development of a second turbulence that creates an unacceptable audible resonance frequency.

Mode of Operation of the Invention

When brake booster 10 is located in a vehicle and the engine is operating in a desired manner, fluid under pressure from a supply system is delivered from a power steering pump through inlet port 90 to inlet chamber 18. Spring 63 urges valve seal 62 into engagement with the first cylindrical bearing 48 to define the working chamber 64 and establish a desired space relationship between ring 78 on the face of valve seal 62 and valve seat 40. Fluid flows between the ring 78 and valve seat 40 through orifice or throat 35 into the plurality of radial bores 36,36" for distribution to outlet chamber 20 and out passage 15 to flow switch 17 in return passage 19. Return passage 19 is connected to a reservoir of the steering system through outlet port 21. Fluid on flowing past seat 40 develops a turbulence that produces a sound that is substantially constant. This turbulence also acts on spring 63 as the fluid flows through orifice 35 to the radial openings or bores 36,36' and also creates a corresponding reaction therein. The combined sounds are communicated throughout the entire housing 12 of brake booster 10 but is of such a degree that the fluid in reaction chamber 60 or other chambers in the brake booster 10 such as inlet chamber 18, working chamber 64 or outlet chamber 20 do not significantly add to the sound level. This sound has been measured to be between 59 dB to 67 dB that is within an acceptable noise level for most humans and when added to the other sounds created in an operating vehicle is not normally definable.

When an operator desires to effect a brake application, an input force is applied to brake pedal to activate control valve 26. The input force is communicated through reaction pin 80 to end 46 of input rod 14 which correspondingly moves valve seal 62 toward valve seat 40 to restrict the flow of fluid from working chamber 64. When the flow of fluid from working chamber 64 is restricted, the fluid pressure in inlet chamber 18 increases and a pressure differential develops across power piston 16. This pressure differential acts on and moves power piston 16 after overcoming return spring 20 to provide a corresponding force which moves piston 28 in master cylinder 30 to pressurize fluid and effect a brake application. As the pressure in chamber 18 increases, a pressure drop immediately occurs downstream from valve seat 40 is recognized as turbulence that can be measured. The flow of this fluid is directed along a flow path that is substantially perpendicular to bore 34 as fluid engages annular projection 80 prior to entry into orifice 35 and as a result the fluid does not impinge on the end coils 63a,63b of spring 63 in a manner to change the reaction therein to a level that would produce an unacceptable noise level.

Figure 4:
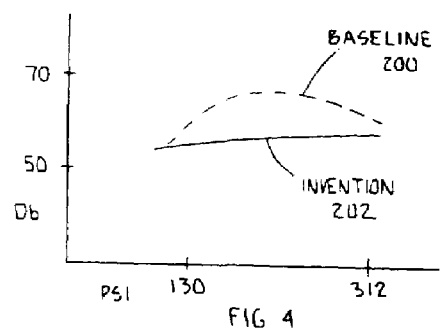
FIG. 4 is a trace of the audible sounds produced by the brake booster of FIG. 1 and of sounds produced by a base line booster.

To evaluate the sound produced by brake booster 10 with a commercial brake booster of a type disclosed in U.S. Pat. No. 4,961,846 a sound meter was used to measure noise. The decibel levels produced by a standard hydraulic brake booster are illustrated by curve or trace 200 in FIG. 4 while decibel levels produced by a brake booster 10 equip with valve seal 62 having a projection 80 that extended into orifice 35 is illustrated by curve or trace 202. Curve 202 demonstrates that brake booster 10 has a lower sound level in a booster when presented with fluid having inlet pressure range of 130 to 312 psi. Thus, by preventing the direct flow of fluid from impinging on spring 63 the development of a reaction therein caused by turbulence in the flow of fluid moving past the face 78 of seal 62 and seat 40, the sound level is attenuated to an acceptable range.

I claim:

1. A fluid power apparatus comprising a housing with a bore therein that is divided by a power piston into an inlet chamber and an outlet chamber, said power piston having passage means with an orifice through which said inlet chamber is connected with said outlet chamber, valve means located in said bore for controlling the flow of a fluid under pressure from a source through said passage means, said valve means including a seat surrounding said orifice, a seal, a valve spring and an input rod, said valve spring urging said valve seal into engagement with said input rod to define a working chamber within said passage means, said fluid under pressure flowing from said inlet chamber to outlet chamber by way of said working chamber and orifice, said flow of fluid from said working chamber to said orifice being along a flow path between said seat and said seal and in a rest mode of operation developing a first turbulence that creates a resonant noise within an acceptable audible level while in an actuation mode of operation instituted by said input rod responding to an actuation force from an operator to move said seal toward said seat to restrict the flow of fluid from said working chamber and cause a corresponding fluid pressure change of the fluid in said inlet chamber that acts on said power piston to create an output force and effect a brake application, said flow of fluid through said orifice during said change in fluid pressure having a second turbulence as fluid is communicated to said outlet port, said valve means being characterized by an annular ring that extends from said seal into said orifice to prevent said second turbulence from impinging on said valve spring and creating a resonant noise therein that exceeds said acceptable audible range wherein said annular ring is characterized by an annular projection that forms a shoulder that retains said valve spring in an axial location downstream from said orifice.

2. The brake system as recited in claim 1 wherein said annular ring is characterized by a sleeve that is concentric to said orifice such that the flow of fluid is directed along an annular path that is substantially parallel to the axis of a bore of the passage means.

3. The brake system as recited in claim 1 wherein said passage means includes a second flow path through said seal and input rod for communicating fluid to a chamber.

4. The brake system as recited in claim 1 wherein said passage means includes a flow path through said seal and input rod for connecting said outlet chamber to a reaction chamber.

5. The brake system as recited in claim 4 wherein said annular ring is characterized by a sleeve having a shoulder on a first end for receiving a first end of said valve spring within said orifice and a second end connected to said seal to position said valve spring within said orifice to prevent fluid flow from impinging on said valve spring.

6. The brake system as recited in claim 1 wherein said valve means is further characterized by an annular shroud that concentric to and extends from said annular ring into said passage means, said valve spring being received by said annular shroud to intercept the flow of fluid to said outlet chamber.

* * * * *